(12) United States Patent
Boehl et al.

(10) Patent No.: US 9,184,679 B2
(45) Date of Patent: Nov. 10, 2015

(54) METHOD FOR PREDICTING THE DURATION OF A FUTURE TIME INTERVAL

(75) Inventors: Eberhard Boehl, Reutlingen (DE);
Bernd Becker, Stuttgart (DE); Bernard Pawlok, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 612 days.

(21) Appl. No.: 13/577,475

(22) PCT Filed: Jan. 12, 2011

(86) PCT No.: PCT/EP2011/050310
§ 371 (c)(1),
(2), (4) Date: Nov. 9, 2012

(87) PCT Pub. No.: WO2011/098312
PCT Pub. Date: Aug. 18, 2011

(65) Prior Publication Data
US 2013/0054666 A1    Feb. 28, 2013

(30) Foreign Application Priority Data
Feb. 9, 2010  (DE) .................. 10 2010 001 710

(51) Int. Cl.
G06F 7/00       (2006.01)
H02P 6/00       (2006.01)
F02D 41/00      (2006.01)

(52) U.S. Cl.
CPC .............. *H02P 6/001* (2013.01); *F02D 41/009* (2013.01); *F02D 41/0097* (2013.01)

(58) Field of Classification Search
None
See application file for complete search history.

(56) References Cited

U.S. PATENT DOCUMENTS

| 5,350,988 A * | 9/1994 | Le ................................. 318/618 |
| 5,436,545 A * | 7/1995 | Bahr et al. .................... 318/727 |
| 2009/0009118 A1 * | 1/2009 | Takeuchi et al. ......... 318/400.38 |

FOREIGN PATENT DOCUMENTS

| CN | 1067341 | 12/1992 |
| CN | 101532563 | 9/2009 |
| DE | 100 63 755 | 7/2002 |
| DE | 10 2005 047 922 | 4/2007 |
| JP | 2005-48644 | 2/2005 |

OTHER PUBLICATIONS

International Search Report, PCT International Application No. PCT/EP2011/050310, dated May 16, 2011.

* cited by examiner

*Primary Examiner* — Michael D Yaary
(74) *Attorney, Agent, or Firm* — Kenyon & Kenyon LLP

(57) ABSTRACT

A method for predicting a value for a length of a future time interval in which a physical variable changes is described, in which at least one measured value for the length of a past time interval and an instantaneously measured value for a length of an instantaneous time interval are taken into account, m values for lengths of past time intervals being added. A first value precedes the instantaneously measured value by k−1, and an mth value precedes the instantaneously measured value by k−m. The m added values are divided by a value for a length of a past time interval which precedes the instantaneously measured value by k. A ratio of the mentioned values is formed. For determining the value to be predicted, an average error is initially added to the instantaneously measured value, forming a sum. The formed ratio is subsequently applied to this sum.

8 Claims, 2 Drawing Sheets

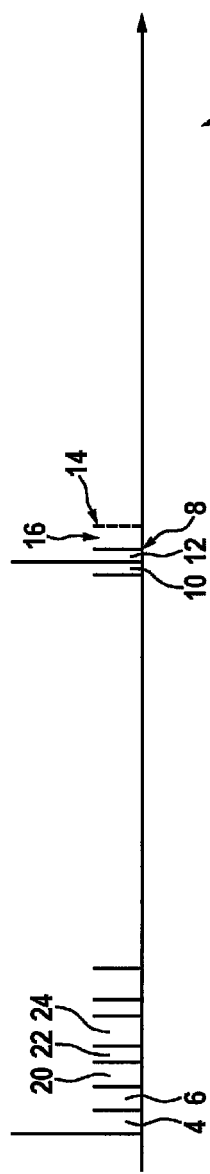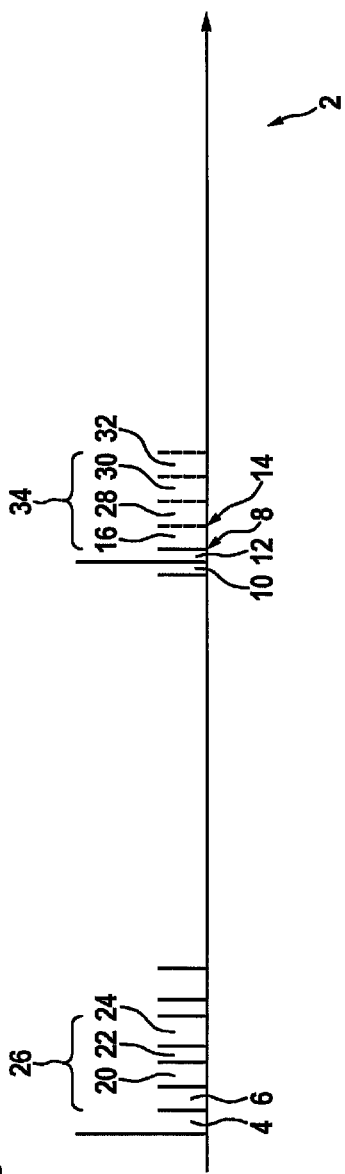

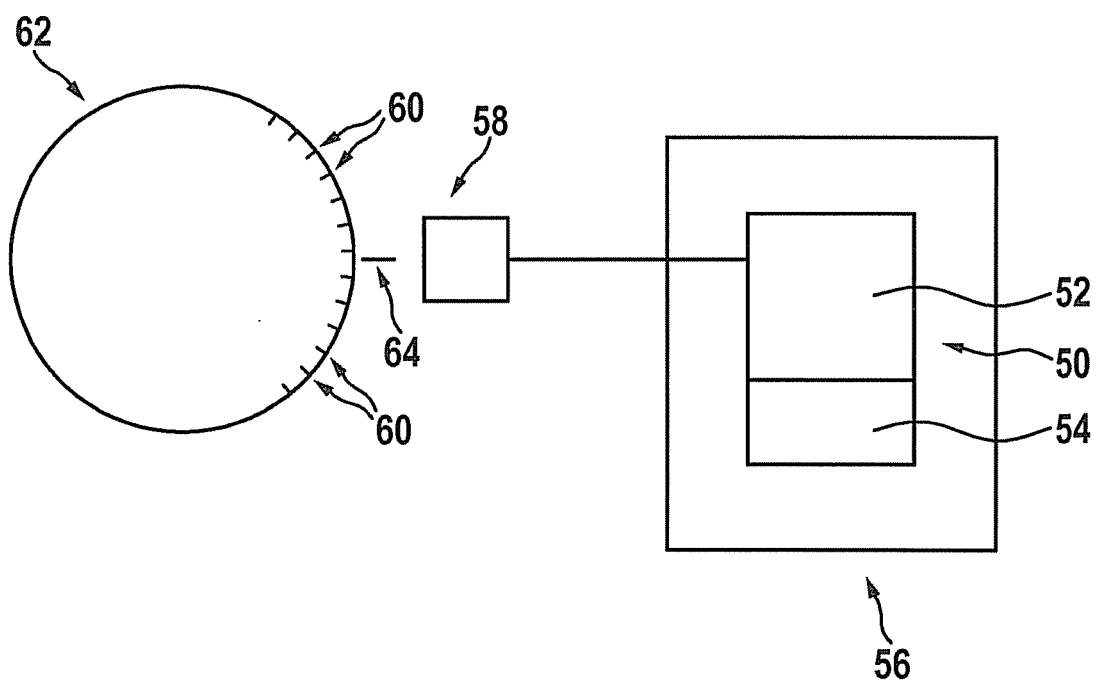

METHOD FOR PREDICTING THE DURATION OF A FUTURE TIME INTERVAL

CROSS REFERENCE TO RELATED APPLICATIONS

The present application is the national stage entry of International Patent Application No. PCT/EP2011/050310, filed on Jan. 12, 2011, and claims priority to Application No. DE 10 2010 001 710.8, filed in the Federal Republic of Germany on Feb. 9, 2010.

FIELD OF INVENTION

The present invention relates to a method for predicting the duration of a future time interval, and a circuit system for generating a value to be predicted.

BACKGROUND INFORMATION

For controlling engines, typically internal combustion engines, sensors exist which indicate a position or location of a moving component, for example the crankshaft, of the engine. In such engines it is customary to use a sensor wheel, fixedly mounted on the crankshaft, to generate signals at certain angles by a sensor whenever a marking begins or ends on the sensor wheel.

German Publication No. DE 100 63 755 A1 describes a method for ascertaining and verifying the occurrence of a singularity for a rectangular-pulse signal. The singularity is recognized if the sum of the time periods between predefinable signal intervals directly before and after the singularity is smaller than the period of time in which the singularity occurs. This method is used, for example, for evaluating a rotation of a rotating body, having a reference mark, which is connected to the crankshaft or the camshaft of an internal combustion engine. The method is carried out in the control unit of the internal combustion engine.

To be able to carry out a synchronization with the instantaneous engine position, one or multiple markings is/are usually left out in the sensor wheel, as also described in German Publication No. DE 100 63 755 A1. However, since the marking positions only very roughly represent the instantaneous engine position, an angular basis is produced via which intermediate positions may be determined with the aid of a precisely defined number of pulses between two sensor signals. For this purpose it is necessary, among other things, to predict the period of time until the next sensor signal.

A method for determining a differential angle of an internal combustion engine between a first angle event and a second angle event is described in Application No. DE 10 2005 047 922 A1. The first angle event has a defined time interval with respect to the second angle event. In carrying out the method, the tooth times of the preceding teeth are ascertained, beginning with the crankshaft angle of the second angle event, and successively added to the time interval between the first angle event and the second angle event, the tooth angles of the teeth included in the particular tooth times being added to the differential angle, and the tooth times being ascertained from the tooth times of a preceding power stroke multiplied by a correction factor.

It is customary to derive the prediction of the instantaneous time interval from the preceding time interval. In addition, the so-called increment angle prediction (IAP) method for step-wise prediction of an angle, which also describes the relationships of the sensor signals with regard to a 720° rotation of the crankshaft, results in an improvement. Furthermore, for computing injection times it may also be necessary to take multiple future time intervals into account. The so-called multi-increment angle prediction (MIAP) algorithm is used for this purpose. Here as well, the future increments are computed based on the corresponding measured increments in the past, as described in Application No. DE 10 2005 047 922 A1.

SUMMARY OF THE INVENTION

According to the present invention, a value for a length of a future time interval, in which a physical variable usually changes periodically, may be predicted. The physical variable may be used, for example, to describe a movement of a component of a technical device, for example a machine or an engine/motor. If the component moves periodically, the future time interval may be used to determine a periodicity of the movement of the component.

According to one exemplary embodiment of the proposed method according to the present invention, it is assumed that the situations, generally operating parameters, repeat periodically, at least for individual components of the engine; this occurs, for example, in one camshaft revolution or in two crankshaft revolutions. This is also the case when the engine is accelerated or decelerated. Therefore, the situation between two adjacent time intervals at the position of the engine in question remains largely the same. However, increased deviations occur in periods of acceleration or deceleration. The operating parameters also include locations or positions of the aforementioned components.

The component of the device or the engine/motor whose movement is to be monitored usually has markings which move synchronously with the component. Movements of the markings are detected by sensors. An instantaneous time interval to be analyzed within the scope of the present invention may be defined by the movement of two markings, which are generally adjacent, relative to a fixed position as a reference point. Thus, the instantaneous time interval may begin when the first marking is at the fixed position and/or reaches the first position, and may end as soon as the second marking is at the fixed position and/or has reached same. Typically, a time interval, and thus also its duration or length, is defined by the occurrence of two successive events which are linked to the movement of the component. The events are indicated by the position of the markings, and may be detected by observing the markings.

While in the methods known from the related art the average deviations either remain unconsidered or are simply added up, in one exemplary embodiment of the present invention, it is possible to make a more accurate prediction of the time intervals or corresponding increments over time, even when their lengths are different, using their quotients, since the average error is multiplied by the quotients before it is incorporated in the predictive value.

The method according to the present invention may also be used, for example, for control systems of electric motors, for example permanent magnet synchronous motors (PMSM). A mechanical revolution and/or position may be determined by multiple pole pairs which are used as markings. Appropriate electrical cycles which may systematically differ from one another may be analyzed. In addition, the effects of all additional units which occur systematically during a mechanical revolution are thus included. In this case as well, the time interval is defined as the time at which a first marking, and subsequently a second marking, reaches and/or passes a position provided as a reference point.

The present invention may be used for an engine control system as well as for controlling devices for which physical variables regularly change at time intervals. This may be used, among other things, for regulating a water level, loading of a mass, for example bulk material, that is poured into a container such as a rail car, determining a connection point of an alternating current source to a power grid with phase accuracy, predicting the optimal point in time or predicting the reaching of a predefined temperature by observing the points in time, using temperature markings in the past. This usually involves the prediction of a time interval or point in time, but the physical variable from which this point in time is derived is not limited to a rotary or linear movement of an engine; instead, a temperature, the level of a liquid, the mass of a bulk material, or the phase position of a periodic oscillation, for example of a current or a voltage, or also a mechanical oscillation of a pendulum may be involved.

Predicting the time interval according to the related art is somewhat imprecise due to the fact that an average error either remains unconsidered in computing the deviations between a prediction and a measurement, as is the case for the method described in Application No. DE 10 2005 047 922 A1, or is simply added up.

A more accurate prediction is made within the scope of the present invention in that, among other things, the error is initially added to the last measured value, and this sum is then multiplied by the ratio of the increments or of the lengths of the intervals in the past. With the aid of this measure, higher accuracy may be achieved, even when the change in the rotational speed or speed of the component is not uniform.

For storing the past values or the measured values for the time intervals from the past or the past time intervals, a dedicated memory area may be provided as a component of one exemplary embodiment of a circuit system according to the present invention. A time interval is usually delimited by two points in time, which likewise may be measured. Within the scope of the present invention, it is also possible to make a prediction for a future time interval by making predictions for future points in time which delimit these future time intervals.

The present invention allows a prediction of the length or duration of a future time interval, and may be used for an engine control system. An application as a hardware approach for a digital variant of a circuit system according to the present invention of an electric motor control system in a hybrid vehicle may be provided.

The circuit system according to the present invention is designed to carry out all steps of the presented method. Individual steps of this method may also be carried out by individual components of the circuit system. In addition, functions of the circuit system or functions of individual components of the circuit system may be implemented as steps of the method. Furthermore, it is possible to implement steps of the method as functions of at least one component of the circuit system or of the entire circuit system.

It is understood that the features stated above and to be explained below may be used not only in the particular stated combination, but also in other combinations or alone without departing from the scope of the present invention.

Further advantages and exemplary embodiments of the present invention are described with reference to the accompanying drawings.

BRIEF DESCRIPTION OF THE DRAWINGS

FIG. 1 shows a schematic illustration of a diagram for a first exemplary embodiment of the method according to the present invention.

FIG. 2 shows a schematic illustration of a diagram for a second exemplary embodiment of the method according to the present invention.

FIG. 3 shows a schematic illustration of one exemplary embodiment of a circuit system according to the present invention.

DETAILED DESCRIPTION

The present invention is schematically illustrated based on exemplary embodiments in the drawings, and is described in greater detail below with reference to the drawings.

The figures are described in an interrelated and all-encompassing manner, with identical components being denoted by the same reference numerals.

Each of the two diagrams in FIGS. 1 and 2 includes a horizontally oriented time axis 2, along which points in time, for which markings of a periodically moving component of an internal combustion engine are detected by sensors, are represented by lines. Time intervals are illustrated between these points in time, namely, a kth past time interval 4 of length DT (−k) and a −k+1th past time interval 6 of length DT (−k+1) which have already been ascertained in the past. In addition, the diagrams in both FIGS. 1 and 2 show a lastly or instantaneously measured point in time 8 as well as the two past time intervals 10 of length DT (−1), and 12 of length DT (0), which have been immediately previously ascertained. The diagram in FIG. 1 also shows a point in time 14 to be predicted. A length CDT (1) of a future time interval 16 to be predicted is delimited by lastly measured point in time 8 and point in time 14 to be predicted.

In addition to −k+1th past time interval 6, the diagrams illustrate three additional subsequent past time intervals 20, 22, 24, which in the diagram in FIG. 2 are combined into an overall interval 26 from the past. FIG. 2 also shows four future time intervals 16, 28, 30, 32 which are combined into a joint predictive value 34 of length DTA(m).

In carrying out the two mentioned exemplary embodiments of the method according to the present invention, it is assumed that the range to be considered includes the last k past time intervals 4, 6, 20, 22, 24, and that the systematic conditions repeat with a periodicity of k, so that, for example, k may be the number of markings of a sensor wheel fixedly mounted on the crankshaft when a periodicity is assumed for a crankshaft revolution. Systematically missing markings may also be taken into account when the absence is established, and the number of missing markings may be deduced using additional information. Likewise, k may be defined as the number of markings for a camshaft revolution, since not every crankshaft revolution is subject to the same conditions.

The position of the crankshaft is determined with the aid of at least one sensor which signals the presence of a marking on a sensor module designed as a sensor wheel. This is typically carried out when an initial position is known, or a selected position is ascertainable from a missing marking. This marking is also taken into consideration with the aid of additional camshaft signals.

As long as no missing marking is detected, k may initially be set to 1, and therefore the ratio XDT(0) of the last two measured past time intervals—in the case of the exemplary embodiment in FIG. 1, the ratio of length DT(−k+1) of 1−kth past time interval 6 (−k+1) to length DT(−k) of kth past time interval 4—may be transferred to the ratio of length CDT(1) of first future time interval 16 to be predicted to last measured instantaneous time interval 12 of length DT(0).

Acceleration and deceleration components are also taken into account, it being assumed that these components will continue similarly in the future. A correction may be made, taking the average error into account. If k is set to 0 and a ratio of the length of two immediately successive time intervals XDT(i) is set to 1, it may simply be assumed that a new time interval has exactly the same length as the preceding time interval.

In addition, it is possible to select value k in such a way that it corresponds to the number of markings per cylinder of an internal combustion engine. Thus, at least at times, for example when information concerning one or two crankshaft revolutions is not yet available, it may be assumed that approximately the same conditions regarding the acceleration in the combustion process or the deceleration during compression are present for each cylinder.

Lengths DT(i) of the last k past time intervals 4, 6, 10, 20, 22, 24, i.e., lengths DT(−k), DT(−k+1), . . . DT(−1), are stored in a memory area in order to predict therefrom the instantaneous duration or length CDT(1) of future time interval 16, having the above-described periodicity, which has just begun.

From these values, ratio XDT of the lengths of two past, immediately successive time intervals having periodicity k are computed corresponding to index k of a time interval, as shown below:

$$XDT(0)=DT(-k+1)/DT(-k).$$

This computed ratio XDT(0), or optionally only reciprocal RDT(−k)=1/DT(−k), may be stored.

For the case that reciprocal RDT(−k) is used, divisions may be dispensed with, since reciprocal RDT(−k) may also be used for computing other ratios.

Previously determined and stored value XDT(−1) or RDT(−1) for preceding past time interval 10 is used to predict the value of the length or duration CDT(1) of instantaneously begun future time interval 16 by multiplying ratio XDT(−1) by length DT(−1) of past time interval 10. It is assumed that the ratios repeat periodically after every k values, as is the case in the diagram in FIG. 1, for example. After the actual value of length DT(0) of last instantaneous time interval 12, which has ended at instantaneously measured point in time 8, is measured, an error EDT (0) for the prediction may be determined as follows:

$$EDT(0)=DT(0)-XDT(-1)*DT(-1)$$

and $$XDT(-1)=DT(-k)/DT(-k-1),$$

resulting in $$EDT(0)=DT(0)-DT(-k)*DT(-1)/DT(-k-1).$$

For the case k=1, in one exemplary embodiment only a past increment or time interval is used for the computation, resulting in the following for the error:

$$EDT(0)=DT(0)-(DT(-1))^2/DT(-2)$$

or $$EDT(0)=DT(0)-(DT(-1))^2*RDT(-2).$$

Recursive addition of error EDT to an average deviation MEDT and division by r2 results in the new average deviation for MEDT(−∞)=0:

$$MEDT(0)=(EDT(0)+MEDT(-1))/2.$$

Based on all of these ascertained values, the new predictive value for length CDT(1) of future time interval 16 is determined as follows:

$$CDT(1)=(DT(0)+MEDT(0))*XDT(0)$$

or, with the aid of reciprocalRDT, $$CDT(1)=(DT(0)+MEDT(0))*DT(-k+1)*RDT(-k).$$

For the example from FIG. 1, the following results for the error of the last prediction:

$$EDT(0)=DT(0)-CDT(-1)*XDT(-1).$$

The weighted average error of the prediction is:

$$MEDT(0)=(EDT(0)+MEDT(-1))/2,$$

which results in the following for the predictive value:

$$CDT(1)=(DT(0)+MEDT(0))*XDT(0).$$

This predictive value for duration or length CDT(1) of next future time interval 16 varies, for acceleration or deceleration, by the value of length DT(0) of last measured instantaneous time interval 12, and takes into account deviations in the preceding measurements for the more accurate prediction.

In addition, for an internal combustion engine, the possibly different combustion and compression processes of each individual cylinder are taken into account when k is selected in such a way that the measured data of two crankshaft revolutions are used. Systematic influences of additional units, for example the use of a hydraulic pump, may thus also be included in the computation. By including the average error in the prediction, changes in the average rotational speed as the result of acceleration inputs, which are usually provided via the gas pedal, or as the result of decelerations produced by the engine brake, are at least partially included for the prediction.

External influences caused by the clutch, transmission, wheels, roadway, wind, etc., also have an effect on the prediction without an overreaction, and thus a build-up of values, occurring. This is generally due to the fact that only one-half of the last ascertained deviation is entered into the new computation, and preceding deviations have a lesser influence in each case. The method may be implemented as software with the aid of a central processing unit (CPU), and/or with the aid of special hardware as possible components of one exemplary embodiment of the circuit system according to the present invention.

In another exemplary embodiment of the present invention, multiple future increments or future time intervals 16, 28, 30, 32, which together form a predictive value 34, may be predicted when a ratio is formed of the sum of the lengths of past time intervals 6, 20, 22, 24, or increments from the past, to length RDT(−k) of preceding past time interval 4 from the past.

For m future time intervals 16, 28, 30, 32, this results in a ratio PDT(m), shown in the diagram in FIG. 2, for implementing an MIAP algorithm, with the aid of which a prediction of multiple angular increments is possible. The time period for the subsequent m future time intervals 16, 28, 30, 32 or increments may thus be predicted corresponding to the predictive value of length DTA(m) for m future time intervals 16, 28, 30, 32.

Thus, for example, as proposed in one exemplary embodiment of the present invention, the number of necessary divisions is reduced as a result of storing the above-described reciprocal instead of the quotient, since, due to multiplying by various added values, the reciprocal always indicates the instantaneous ratio. The division is therefore carried out only once. In addition, in each case only multiplications are necessary, which may be carried out with less hardware or with less computing time.

In detail, in the exemplary embodiment of the method according to the present invention shown in FIG. 2, initially a ratio PDT(0) of the lengths of m future time intervals 16, 28, 30, 32 or increments to at least one preceding past time interval of a period is determined, the lengths of the preceding past time intervals 4, 6, 10, 20, 22, 24 from the past being added up, and divided by length DT(−k) of the last considered past time interval from the past:

$$PDT(0) = \frac{\sum_{i=1}^{m} DT(-k+1)}{DT(-k)} = RDT(k) * \sum_{i=1}^{m} DT(-k+1).$$

For error EDT(0) of the last prediction, the following results, similarly as for FIG. 1:

EDT(0)=DT(0)−(DT(1)*PDT(−1)).

Weighted average error MEDT(0) of the prediction is, for example:

MEDT(0)=(EDT(0)+MEDT(−1))/2, but may also be weighted differently, for example:

MEDT(0)=(EDT(0)+2*MEDT(−1))/3 or

MEDT(0)=(2*EDT(0)+MEDT(−1))/3 or

MEDT(0)=(3*EDT(0)+MEDT(−1))/4, and so forth.

Overall, the following applies for the predictive value of length DTA(m) of m future time intervals:

DTA(m)=(DT(0)+MEDT(0))*PDT(0).

In one exemplary variant of the present invention, instead of the markings of the described sensor wheel on a crankshaft or a camshaft, signals of a sensor module which are detected by sensors situated on an electric motor (PMSM) are processed as markings, typically three sensors being provided which subdivide an electrical cycle into six areas. Likewise, predicting a movement of a sensor rod, such as a gear rack, for example, for a periodically repeated linear left-to-right movement is conceivable.

In addition, liquid level sensors for periodically filling and discharging a liquid may be considered as a component of a device, for example an engine/motor. The level of a liquid may also be regulated when reaching a level is to be predicted from the past for the liquid level sensor. For example, the point in time when a valve is to be opened or closed may thus be determined.

By continuously measuring the mass of a component in a container, a signal being output at predefined discrete mass values, it may be determined at which point in time a target mass value is reached at which the supply and/or the removal of the mass is stopped. By outputting a signal to a temperature sensor, for example, the point in time at which a positive or negative supply of heat must be stopped in order to reach a target temperature may be determined for each 1° C. increment. By outputting signals at the zero crossing and/or the maximum or minimum of an oscillation, the point in time for a desired phase position may be predicted, for example for connecting an alternating current source or for coupling a mechanical component.

In another exemplary embodiment, selected values for physical variables and thus also electronic variables, for example analog voltage, current, resistance, or capacitance values, may also be considered as periodically changing values of the sensor module. This involves, for example, a zero crossing or a maximum or minimum of a sinusoidal oscillation for any given physical variable. Regardless of which technical modules for which movements are to be determined, these technical modules are provided with markings whose movements may be detected by sensors. A future time interval 16, 28, 30, 32 to be measured and/or predicted is defined by the occurrence of two events, a first event generally occurring at which a first marking has reached a defined position, and a second event occurring at which a second marking has reached the defined position.

FIG. 3 shows a schematic illustration of one exemplary embodiment of a circuit system 50 according to the present invention, which includes a data processing module 52 and a memory area 54 and is situated in a control unit 56 of an internal combustion engine. Circuit system 50 is connected to a sensor 58. Sensor 58 is designed to detect markings 60 which are situated on a periodically moving sensor wheel 62 as a sensor module. Sensor wheel 62 is connected to a camshaft or a crankshaft (not shown) of the internal combustion engine.

Therefore, a movement of the camshaft or crankshaft is represented by a movement of markings 60 on sensor wheel 62. A duration of a time interval to be measured and predicted is a function of the time that elapses between the passing of two adjacent markings 60 of moving sensor wheel 62.

Predicting the duration of a future time interval, taking into account up to k measured values in the past and an additional instantaneous measured value, is possible with the aid of circuit system 50. The measured values have a periodicity k in the form in which adjacent measured values have a specific systematic ratio with respect to one another based on the design or operational properties, in the present case, of sensor wheel 62. To predict the future time interval between two markings 60, the ratio of the measured value which precedes the instantaneous measured value by k to at least one subsequent measured value is used to deduce the subsequent measured value to be predicted from the instantaneous measured value, an average error for the last measured value being added before a ratio of the measured values from the past is applied to this sum. Based on the predicted measured value of the most recent past time interval and the actually determined measured value of the most recent past time interval, a deviation may be ascertained by difference formation, this deviation being incorporated in the average error. It is also provided that the deviations of the last predictions are incorporated in the average error, and the values for deviations which are farther in the past have a lower weighting the farther in the past they are.

With the aid of the value predicted within the scope of the present invention and ascertained using the described algorithm, monitoring and therefore control and/or regulation of the function of at least one component of the engine/motor, and thus possibly of the entire engine/motor, is/are possible.

What is claimed is:

1. A method for controlling one of an engine or a motor having a rotating component which changes speeds, by predicting a value for a length of a future time interval in which a the rotating component of one of the engine or the motor undergoes rotation of a predefined arc length, comprising:

taking into account, by a data processor, at least one measured value for a length of a past time interval and a measured value for a length of an instantaneous time interval, adding, by the data processor, m values for lengths of past time intervals, a first value preceding the instantaneously measured value by k−1 and an mth value preceding the instantaneously measured value by k−m, and the m added values being divided by a value for a length of a past time interval which precedes the instantaneously measured value by k, thereby forming a ratio, for determining the value to be predicted, initially adding, by the data processor, an average error to the instantaneously measured value, thereby forming a sum, and subsequently multiplying the formed ratio by the sum, and using the predicted value for controlling an operation of the one of the engine or the motor.

2. The method according to claim 1, wherein a value of m is selected to be greater than or equal to 1 and less than or equal to k.

3. The method according to claim 1, wherein the values for the lengths of the past, instantaneous and future time intervals have a periodicity of k, and the values for the lengths of adjacent past, instantaneous and future time intervals have a systematic ratio with respect to one another.

4. The method according to claim 1, further comprising:
for at least one past time interval, based on a predictive value for a length of the at least one past time interval and an actually determined value of a length of the at least one past time interval, ascertaining a deviation by difference formation, the at least one ascertained deviation being incorporated in the average error.

5. The method according to claim 4, further comprising:
weighting multiple ascertained deviations as a function of how far in the past a deviation is formed for a respective past time interval, deviations which are farther in the past having a lower weighting.

6. The method according to claim 1, wherein the component has a number of markings which move when the component moves relative to a defined position, a beginning of at least one past, instantaneous and future time interval being established by a point in time at which a first marking moves past the defined position, and an end of the at least one past, instantaneous and future time interval being established by a point in time at which a second marking moves past the defined position.

7. A circuit system for controlling one of an engine or a motor having a rotating component which changes speeds, by predicting a length of a future time interval in which the rotating component of one of the engine or the motor undergoes rotation of a predefined arc length, comprising:
at least one data processing module configured to:
determine a value for a length of a future time interval in which a physical variable changes,
take into account at least one measured value for a length of a past time interval and an instantaneously measured value for a length of an instantaneous time interval,
add m values for lengths of past time intervals, a first value preceding the instantaneously measured value by k−1, and an mth value preceding the instantaneously measured value by k−m, the m added values being divided by a value for a length of a past time interval which precedes the instantaneously measured value by k, thereby forming a ratio,
for determining the value to be predicted, initially add an average error to the instantaneously measured value, thereby forming a sum, and subsequently multiply the formed ratio by the sum, and
use the predicted value for controlling an operation of the one of the engine or the motor.

8. The circuit system according to claim 7, wherein the system is configured as a module of a control unit for an internal combustion engine.

\* \* \* \* \*